(No Model.)

J. CAMPBELL.
STEAM SHOVEL.

No. 558,631. Patented Apr. 21, 1896.

WITNESSES
H. H. Carter
M. P. Raymond

INVENTOR
Jeremiah Campbell
by his attys.
Clarke & Raymond

United States Patent Office.

JEREMIAH CAMPBELL, OF CHELSEA, MASSACHUSETTS.

STEAM-SHOVEL.

SPECIFICATION forming part of Letters Patent No. 558,631, dated April 21, 1896.

Application filed August 30, 1895. Serial No. 560,989. (No model.)

*To all whom it may concern:*

Be it known that I, JEREMIAH CAMPBELL, a citizen of the United States, residing at Chelsea, in the county of Suffolk and State of Massachusetts, have invented a new and useful Improvement in Steam-Shovels, of which the following is a full, clear, and exact description, reference being had to the accompanying drawings, forming a part of this specification in explaining its nature.

It is important in the class of steam shovels, buckets, &c., using a transferring-trolley which is horizontally movable some distance upon a horizontal track, or track substantially horizontal, by a trolley rope or cable, the trolley carrying a roll over which one or more ropes for hoisting, carrying, and lowering said shovel, scoop, or other similar device extend, to automatically prevent the turning of the shovel-scoop or other device while it is being hoisted, carried, and lowered, and to also cause a draft to be exerted upon the trolley-operating roll to remove the slack therefrom and exert a continuous strain upon it; and I have discovered that these objects can be accomplished by substantially the same or a common mechanism. The trolley and the steam-shovel herein shown are like those described in the Campbell and Kelley application, Serial No. 535,496, filed January 19, 1895; but I do not confine myself to the special type of shovel herein represented, as any form of scoop, bucket, or shovel may be used. The shovel, however, instead of being connected with an extension of the trolley, as described in said application, is attached to the trolley-rope at some distance back from the trolley, so that the trolley-ropes support the weight and the weight acts to remove the slack therefrom and exert strain or tension upon it.

Figure 1:
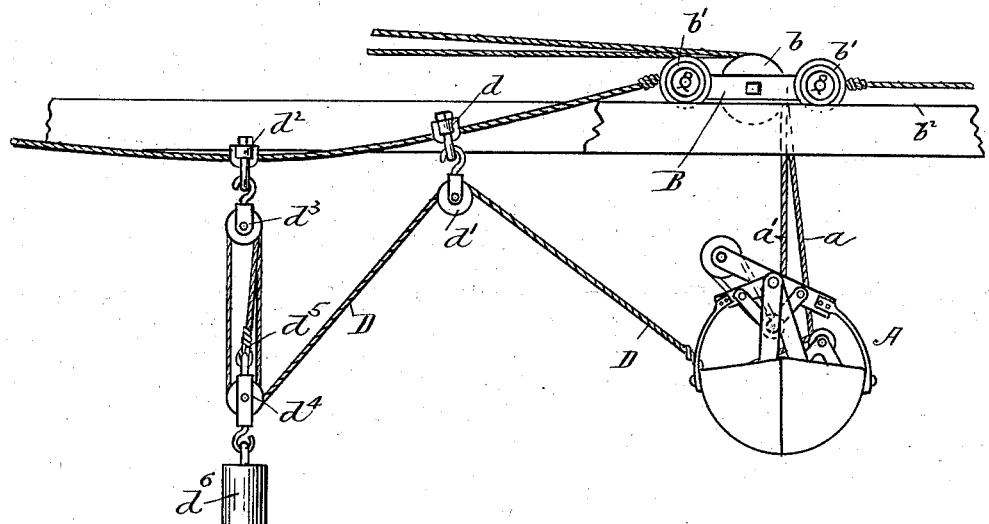
Figure 2:
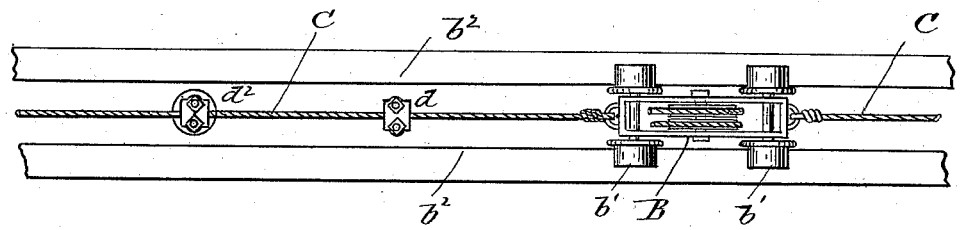

Referring to the drawings, Figure 1 is a view, partly in side elevation, of enough of the device to which my invention appertains to illustrate it. Fig. 2 is a view in plan thereof.

A represents the type of shovel known as the "clam-shell" shovel and which is automatically loaded and unloaded, and the best types of this shovel have two operating-ropes $a\ a'$. These ropes are represented as passing over the roll or drum $b$, carried by the trolley B, and they extend therefrom to the winding-drums of the stationary actuating-engine. The trolley has wheels $b'$, mounted upon the track $b^2$, and it is drawn backward and forward upon the said track to carry the shovel, scoop, or bucket from one point to another by a trolley-rope C, which is an endless rope, one end of which extends around a drum or wheel (not shown) and back to a spool on the stationary engine, to which the other section of the rope also extends. To this trolley-rope there is secured, by a suitable clamp $d$, the pulley $d'$, and by the clamp $d^2$, farther away from the trolley than the clamp $d$, there is secured to the trolley-rope the pulley $d^3$. A rope D extends from one side of the shovel diagonally outward and upward over the pulley $d'$ about the pulley $d^4$ and the pulley $d^3$ one or more times, and its end $d^5$ is attached to the housing of the pulley $d^4$, and the said housing $d^4$ has attached to it the weight $d^6$. The rope D may be attached by a bridle to the corners of the shovel at the side, if desired.

It will be understood that the rope D and the weight $d^6$ not only serve to prevent the shovel from twisting as it is being lifted and lowered, and especially while it is being carried by the trolley B and suspended therefrom, but that the strain of the shovel and the weight $d^6$ and the other parts of the device drag upon the trolley-rope and thereby exert upon it tension and also take up the slack therein.

While I have mentioned only ropes, I wish it to be understood that any flexible operating connections, whether ropes, cords, or chains, may be used.

I do not claim the invention broadly or as described in the application of Daniel H. Kelley, filed October 19, 1895, Serial No. 566,207. Neither do I claim it specifically as described in the application of the said Kelley and myself, filed January 19, 1895, Serial No. 5 35,496, but only as used to accomplish the purpose or result herein specified.

Having thus fully described my invention, I claim and desire to secure by Letters Patent of the United States—

1. The combination of a horizontally-movable trolley, a shovel, bucket or scoop suspended therefrom, the trolley-moving rope, a pulley attached to the trolley-moving rope, and a rope extending from the shovel, scoop or bucket over said pulley and a weight, as and for the purposes described.

2. The combination of a horizontally-movable trolley, a shovel, scoop or bucket suspended therefrom and movable vertically in relation thereto, and also movable horizontally therewith in a fixed relation thereto, the trolley-moving rope C, a pulley $d'$ fixed thereon to move therewith, a pulley $d^3$ fixed thereon to move therewith, the pulley $d^4$, the weight $d^6$ carried thereby and the rope D passing over the pulley $d'$ and about the pulley $d^4$ and pulley $d^3$, the end of the rope being attached to the housing of the pulley $d^4$, as and for the purposes described.

JEREMIAH CAMPBELL.

In presence of—
JAMES A. LOWELL,
E. L. FORD.